(12) United States Patent
Liao et al.

(10) Patent No.: US 11,803,273 B2
(45) Date of Patent: Oct. 31, 2023

(54) TOUCH SENSOR, TOUCH PAD, METHOD FOR IDENTIFYING INADVERTENT TOUCH EVENT AND COMPUTER DEVICE

(71) Applicant: PIXART IMAGING INC., Hsin-Chu (TW)

(72) Inventors: Chi-Chieh Liao, Hsin-Chu (TW); Yi-Hsien Ko, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 17/237,326

(22) Filed: Apr. 22, 2021

(65) Prior Publication Data

US 2022/0342530 A1     Oct. 27, 2022

(51) Int. Cl.
*G06F 3/041* (2006.01)
*G06F 3/044* (2006.01)

(52) U.S. Cl.
CPC ........ *G06F 3/04182* (2019.05); *G06F 3/0446* (2019.05); *G06F 3/04164* (2019.05); *G06F 3/04186* (2019.05)

(58) Field of Classification Search
CPC ............... G06F 3/04182; G06F 3/0446; G06F 3/04164; G06F 3/04186
USPC ................................................. 345/173, 174
See application file for complete search history.

(56) References Cited

U.S. PATENT DOCUMENTS

| 9,823,890 | B1* | 11/2017 | Lewbel | G06F 3/1446 |
| 2006/0044259 | A1* | 3/2006 | Hotelling | G06F 1/1684 |
| | | | | 345/156 |
| 2007/0268269 | A1* | 11/2007 | Chang | G06F 3/0485 |
| | | | | 345/173 |
| 2008/0162996 | A1* | 7/2008 | Krah | G06F 3/0445 |
| | | | | 345/173 |
| 2013/0265269 | A1* | 10/2013 | Sharma | G06F 3/0488 |
| | | | | 345/173 |
| 2020/0387245 | A1* | 12/2020 | Chen | G06F 3/0202 |
| 2021/0263556 | A1* | 8/2021 | Degner | G06F 3/04883 |

\* cited by examiner

*Primary Examiner* — Jimmy H Nguyen
(74) *Attorney, Agent, or Firm* — Li & Cai Intellectual Property (USA) Office (57) ABSTRACT

A touch sensor, a touch pad, a method for identifying an inadvertent touch event and a computer device are provided. A control circuit of the touch sensor identifies whether there is the inadvertent touch event in response to the touch signals that indicates at least one touch event applied to the touch pad having the touch sensor. In the method, the touch signals are discarded if the inadvertent touch event is identified when a touch position corresponding to the touch signals is within an object detection area defined for the touch pad, or the touch positions in response to the touch signals are reported to the computer device if a multi-touch event is identified when the touch positions are within a touch detection area defined for the touch pad.

4 Claims, 5 Drawing Sheets

TOUCH SENSOR, TOUCH PAD, METHOD FOR IDENTIFYING INADVERTENT TOUCH EVENT AND COMPUTER DEVICE

FIELD OF THE DISCLOSURE

The present disclosure provides a technology for identify false touch event applied to a touch pad, and more particularly to a touch sensor, a touch pad, a method for identifying an inadvertent touch event and a computer device.

BACKGROUND OF THE DISCLOSURE

A touch pad is generally an input device of a computer device and has gradually become an indispensable peripheral device substituting for a conventional computer mouse used with a computer device, especially on a laptop computer. The touch pad used as the input device of the laptop computer provides an exposed touch panel at a specific region, allowing a user to perform a finger gesture thereon.

In general, various gestures can be performed on the touch panel. For example, a fingertip pressed on a specific position initiates a function such as a left or right click of a computer mouse, a two-finger gesture performed on the touch panel initiates a function that switches workspaces in an operating system, and sliding the fingertip over the touch panel initiates a function that enables the cursor to move on a screen of the computer device.

Figure 1:
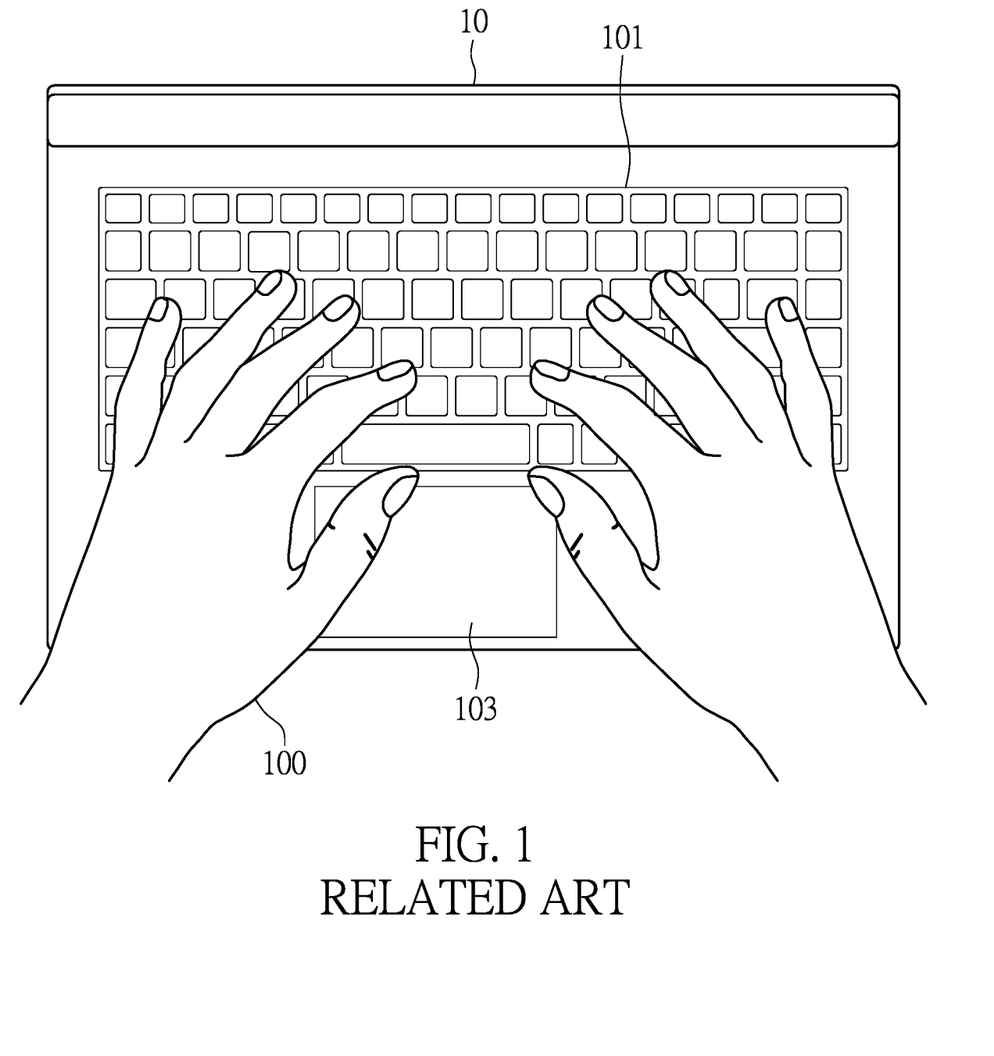
FIG. 1 is a schematic diagram illustrating a circumstance that two hands tap on a keyboard of a computer device having a touch pad.

According to the conventional design of a laptop computer, reference is made to FIG. 1, which is a schematic diagram illustrating a scene where two hands 100 tap on a keypad 101 of a computer device 10 having a touch pad 103, and the touch pad 103 as shown in the diagram is typically disposed below (or on a side of the keypad 101 in particular designs) the keypad 101 of the computer device 10, e.g., a laptop computer.

However, such design may cause errors due to technical inadequacies. For example, as shown in the figure, a user that types on the keypad 101 with fingers of the hands 100 and palms of the hands 100 may inadvertently touch the touch pad 103 next to the keypad 101. The inadvertent touch event may generate a false instruction to an operating system of the computer device 10 and cause an incorrect operation.

For overcoming the inadvertent touch event when the user types on the keypad 101, a conventional mechanism such as a precision touchpad protocol (PTP) supported by the MICROSOFT WINDOWS® operating system is provided to periodically report contact information of the touch pad 103 to the operating system. Based on the PTP, the operating system can determine the type of a touching object, for example, the object can be determined as the fingers or the palm. If the touching object is determined as the palm based on a confidence value, the operating system regards a touch event by the palm as an unintentional touch.

One disadvantage of the PTP mechanism, however, is that it can only filter out inadvertent touch events made by a static touching object, and often fails to function when the touching object changes randomly according to actual behavior, e.g., typing on the keypad 101.

SUMMARY OF THE DISCLOSURE

In response to the above-referenced technical inadequacies, the present disclosure provides a touch sensor, a touch pad having the touch sensor, a method for identifying an inadvertent touch event and a computer device. One of the objectives of the method is to prevent a false touch event caused by a user touches the touch pad inadvertently when the user uses a computer device having the touch pad.

In one aspect, the present disclosure provides the touch sensor having a control circuit that performs the method for identifying an inadvertent touch event. When the control circuit receives a plurality of touch signals indicating at least one touch event applied to the touch pad, an inadvertent touch event can be identified when a touch position corresponding to at least one of the plurality of touch signals is within an object detection area of the touch pad. Related touch signals can be discarded. Conversely, if a multi-touch event is identified, the control circuit reports the touch positions to an operating system when the touch positions corresponding to all of the plurality of touch signals are within a touch detection area of the touch pad.

In certain embodiments of the present disclosure, in response to a touch event, the touch signals are performed on the touch panel having the object detection area and the touch detection area of the touch pad, and the touch signals are instantly processed by the control circuit of the touch sensor.

In an embodiment of the present disclosure, the touch pad includes a touch panel that is formed by multiple interlaced transmit lines and receive lines used to sense the touch event when an object touches a position defined by the one or more transmit lines and receive lines of the touch panel.

When the touch event is performed on the object detection area of the touch pad, a number of the transmit lines that are active is reduced until the inadvertent touch event ceases. In one aspect, the object detection area is formed by extra transmit lines and receive lines of the touch panel and is outside a main part of the touch pad in order to sense the inadvertent touch event performed outside the main part of the touch pad. In another aspect, the object detection area is configured on a left side and a right side of the touch pad for sensing the inadvertent touch event that is performed by a part of the user's palm.

In another aspect of the present disclosure, a touch pad includes a touch panel that defines a touch detection area by a plurality of first type of electrode sets, and the touch panel is exposed within a window of the upper case. The touch panel defines an object detection area by at least two second type of electrode sets disposed at two opposite sides of the touch detection area.

In another aspect of the present disclosure, the method for identifying an inadvertent touch event includes a step of receiving touch signals by a control circuit of a touch sensor in response to a touch event performed on a touch pad having the touch sensor when an application is executed in an operating system of a computer device, a step of identifying a touch position corresponding to the touch signals in response to the touch event, and a step of identifying the touch event as the inadvertent touch event if the touch signals match a set of inadvertent parameters specified to the application executed in the operating system.

In one embodiment of the present disclosure, the application is classified into one of software types that are configured to specify different sets of inadvertent parameters in order to adaptively identify the inadvertent touch event according to the software type of the application. The inadvertent parameters essentially specify an object size sensed by the touch sensor and/or an active area of the touch pad.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a touch sensor, a touch pad having the touch sensor, a method for identifying an inadvertent touch event and a computer device. One of the objectives of the method is to prevent a false touch event caused by a user touching the touch pad inadvertently when two hands of the user type on a keyboard of the computer device having the touch pad. For example, a part of the user's palm may easily touch the touch pad when his fingers type on the keyboard since the touch pad is generally disposed on a side of the keyboard by a small distance. The false touch event may lead to an incorrect movement of a cursor on a display of the computer device or a wrong operation of a left or right key function of the touch pad.

For improving the precision of determining the inadvertent touch event applied to the touch pad of the computer device, instead of than a conventional precision touchpad protocol (PTP) mechanism, a sensing area of the touch pad is configured to be divided into two areas for distinguishing an actual touch event and the inadvertent touch event according to the present disclosure. In an aspect, the touch sensor installed in the touch pad is configured to define an object detection area for detecting the inadvertent touch event and a touch detection area for detecting a multi-touch event. One of the objectives of the present disclosure is to reduce the possibility of false touch by effectively discarding the inadvertent touch event without changing the user's typing behavior.

Figure 2:
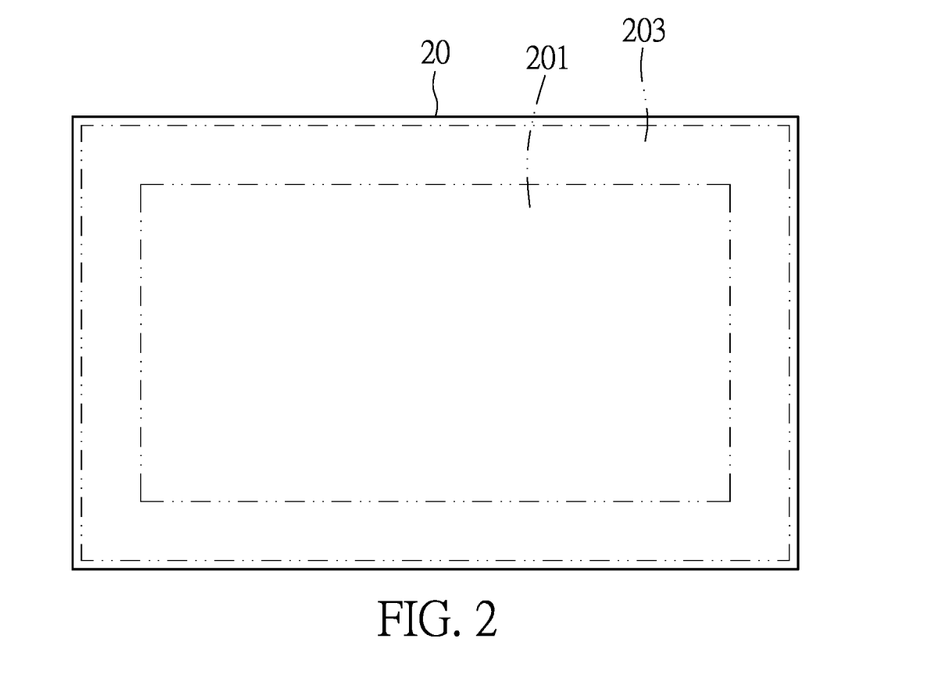
FIG. 2 is a schematic diagram depicting a touch panel that is configured to define an object detection area and a touch detection area according to one embodiment of the present disclosure.

Reference is made to FIG. 2, which is a schematic diagram depicting a touch panel that is configured to define an object detection area and a touch detection area according to one embodiment of the present disclosure.

According to the drawing, a touch panel 20 formed by interlaced conductive lines such as multiple interlaced transmit lines and receive lines or interlaced electrode sets in a touch pad of a computer device is provided. According to one embodiment of the present disclosure, through a touch sensor, a surface region of touch panel 20 is defined as a touch detection area 201 that occupies a main part of the touch panel 20 and an object detection area 203 that is configured to surround the touch detection area 201. It should be noted that the main part of the touch panel 20 means an area that occupies at least 50% or more than 70% of the middle area of the touch panel 20. Accordingly, a control circuit of the touch sensor can distinguish the touch signals generated by the conductive lines or the electrode sets arranged in the touch detection area 201 and the object detection area 203.

In an aspect of the present disclosure, a first type of electrode sets and a second type of the electrode sets form the touch sensor of the touch pad. The plurality of first type and second type of electrode sets are formed by multiple pairs of sensing electrodes, and the touch event is sensed by the touch sensor when an object touches a position defined by the first and second type of electrode sets. The touch detection area can be defined by the plurality of first type of electrode sets that are configured to be exposed within a window of the upper case, and the object detection area can be defined by at least two of the second type of electrode sets disposed respectively at two opposite sides of the touch detection area which are disposed under the upper case.

Through the touch sensor formed by the conductive lines or the electrode sets, an inadvertent touch event is identified when a touch position corresponding to at least one of the plurality of touch signals is within the object detection area, or a multi-touch event is identified when the touch positions corresponding to all of the plurality of touch signals are within the touch detection area.

Figure 3:
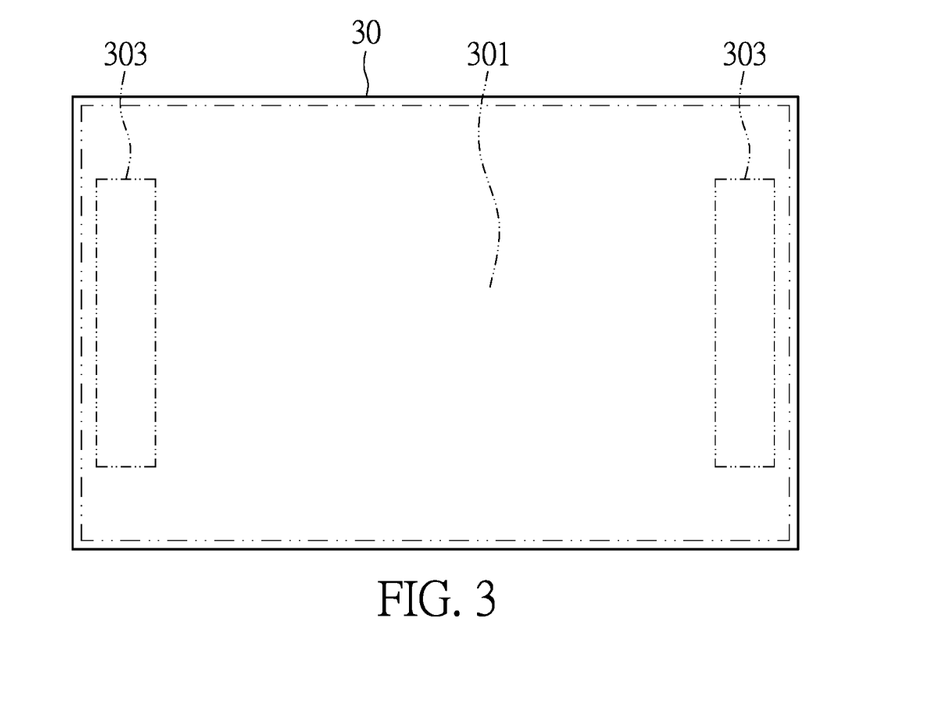
FIG. 3 is another schematic diagram depicting a touch panel that is configured to define an object detection area and a touch detection area according to one embodiment of the present disclosure.

Further, reference is made to FIG. 3, which is another schematic diagram depicting the touch panel according to another embodiment of the present disclosure.

A touch panel 30 is exemplarily shown in the drawing. In the present embodiment, a surface region of touch panel 30 is defined as a touch detection area 301 that occupies a main part of the touch panel 30, and an object detection area 303 including two separate areas that are configured at a left side and a right side of the touch panel 30, respectively.

Figure 4:
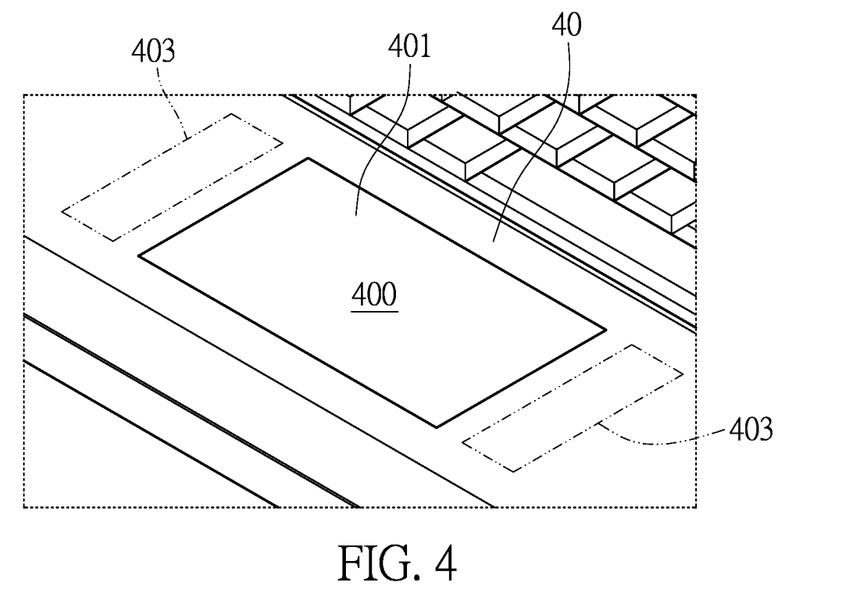
FIG. 4 is a schematic diagram depicting a touch pad having a touch panel covered by an upper case according to one embodiment of the present disclosure.

Reference is further made to FIG. 4, which schematically shows a touch pad having a touch panel covered by an upper case according to one embodiment of the present disclosure.

The drawing shows a portion of an upper case 40 having a touch pad of a laptop computer. A touch panel is imbedded in an opening of the upper case 40 and defines a touch detection area 401 at a main part 400 of the touch pad. An object detection area 403 including two separate areas is defined at two opposite sides of the touch detection area 401 for detecting the inadvertent touch event. In the drawing, the object detection area 403 is configured on a left side and a right side of the touch pad for sensing the inadvertent touch event that may be performed by a part of the user's palm. Furthermore, for implementing the object detection area 403, the object detection area 403 can be formed by extra transmit lines and receive lines of the touch panel that are outside the main part 400 of the touch pad in order to sense the inadvertent touch event performed outside the main part 400 of the touch pad.

It should be noted that the aspect of the object detection area shown in FIG. 2 surrounding the touch detection area or another aspect of the object detection area shown in FIG. 3 or FIG. 4 setting at two opposite sides of the touch detection area can effectively identify the inadvertent touch event performed on an edge area of the touch panel. For example, referring to the diagram as shown in FIG. 1, when the user types on the uppercase/keypad of the computer device with his two hands, the object detection area can effectively detect the inadvertent touch event if his palm unintentionally contacts the edge area of the touch panel. Therefore, the false touch event can be eliminated.

Figure 5:
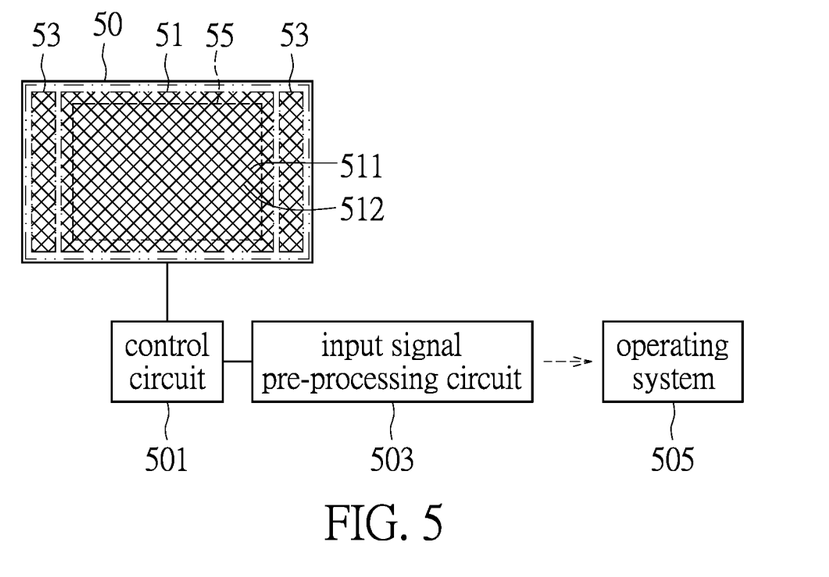
FIG. 5 is a circuit block diagram depicting a touch sensor disposed in the touch pad according to one embodiment of the present disclosure.
Figure 6:
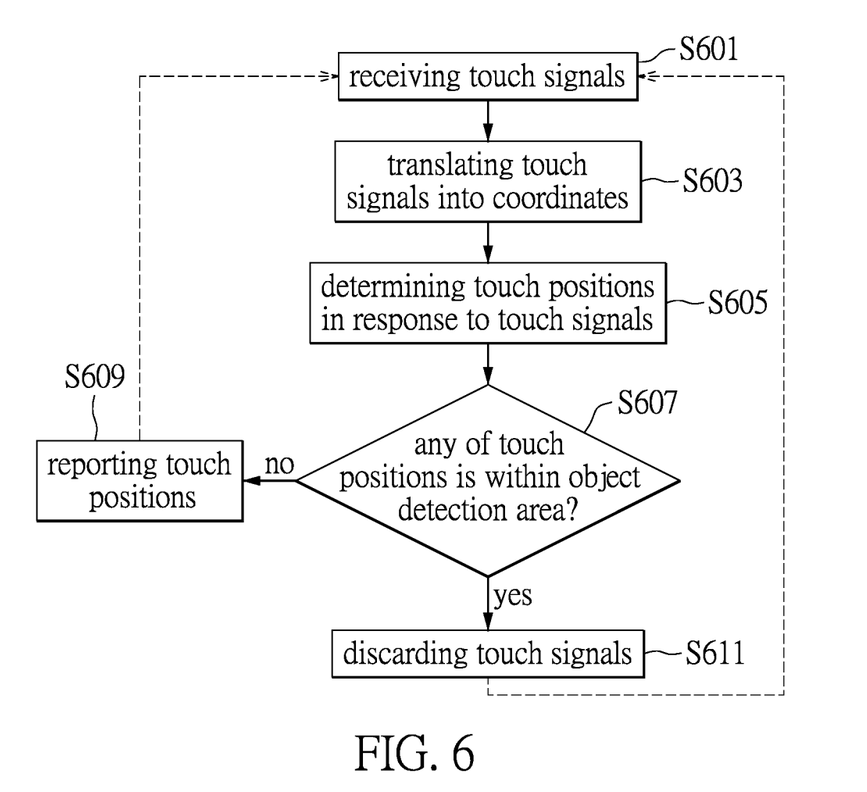
FIG. 6 is a flowchart describing a method for identifying an inadvertent touch event according to one embodiment of the present disclosure.

FIG. 5 is a circuit block diagram depicting a touch sensor disposed in the touch pad according to one embodiment of the present disclosure. Reference is also made to FIG. 6 that shows a flowchart of the method for identifying the inadvertent touch event. A computer device is provided. The computer device includes a processor that performs an operating system 505, and a touch pad that is electrically connected with the processor. The touch pad has a touch sensor which includes a control circuit 501 for performing the method for identifying an inadvertent touch event.

The method is generally performed in the control circuit 501 of the touch sensor. In response to a touch event performed on the touch panel 50 having an object detection area 53 and a touch detection area 51, a plurality of touch signals are instantly processed by the control circuit 501 of the touch sensor. In response to the touch event performed on a sensing area of the touch panel 50 having the object detection area 53 and the touch detection area 51 of the touch panel 50, the plurality of touch signals are instantly processed by the control circuit 501 of the touch sensor.

In the method, such as in step S601, the control circuit 501 receives a plurality of touch signals that indicate at least one touch event applied to a touch pad having the touch sensor. For example, the touch panel 50 that is formed by the multiple interlaced transmit lines 511 and receive lines 512 generates the touch signals when the touch event is sensed by the touch sensor when an object, e.g., the user's hand, touches a position defined by one or more transmit lines 511 and receive lines 512 of the touch panel 50. In step S603, the control circuit 501 of the touch sensor translates the touch signals into a set of coordinates corresponding to the touch event, and then, such as in step S605, in response to the touch signals, determines one or more touch positions.

According to the arrangements of the touch detection area 51 and the object detection area 53 of the touch panel 50, the control circuit 501 can determine whether or not any or a certain amount of the touch positions is within the object detection area 53, such as in step S607. Accordingly, an inadvertent touch event can be identified if any or a certain amount of the touch positions is determined to be within the object detection area 53, then, the related plurality of touch signals can be discarded, such as in step S611. More, in one further aspect, the touch event can be identified as an inadvertent touch if the touch events occur on both the object detection area 53 and the touch detection area 51 simultaneously or within a specific period of time. On the contrary, a multi-touch event can be identified if all or a certain amount touch signals are determined to be within the touch detection area 51 (i.e., there is no or only a certain amount of the touch signals to be determined to be within the object detection area 53). Accordingly, in step S609, the plurality of touch positions are reported to the operating system 505 when the touch positions corresponding to all or a certain amount of the touch signals are within the touch detection area 51 of the touch panel 50.

According to one embodiment of the present disclosure, the control circuit 501 is electrically connected to an input signal pre-processing circuit 503 of the touch sensor. The input signal pre-processing circuit 503 is provided to report the plurality of touch positions to the operating system 505, and therefore provide more precision touch signals to the operating system 505 of a computer device equipped with the touch panel 50 included in a touch pad that is one of the peripheral components of the computer device. In an aspect of the present disclosure, the input signal pre-processing circuit 503 is used to receive the touch signals with information including coordinates of the touch positions on a touch panel 50 of the touch pad from the control circuit 501 when, in response to the touch event, the control circuit 501 receives the touch signals. Further, the input signal pre-processing circuit 503 also identifies the touch event as the inadvertent touch event if the touch signals match a set of inadvertent parameters specified to the application.

Furthermore, according to one further aspect of the present disclosure, the control circuit 501 of the touch sensor can adaptively adjust the performance of the touch panel 50 based on a circumstance that the touch event is determined as the inadvertent touch event. For example, when the touch event performed on the object detection area of the touch pad is determined (such as in step S607 of FIG. 6) as the inadvertent touch event, a number of the transmit lines or the receive lines that are active can be reduced until the inadvertent touch event ceases. This mechanism allows the computer device to reduce unnecessary energy consumption.

According to an aspect of the present disclosure, an active area 55 can be defined with a sensing area of the touch panel 50. For example, the active area 55 can be smaller than the sensing area of the touch panel 50 for sensing the actual touch event, and is able to prevent the false touch performed on an edge area of the touch panel 50. In one aspect of the present disclosure, the active area 55 of the touch panel 50 can be adaptively adjusted in accordance with the attributes of the applications executed in the operating system.

In one embodiment of the present disclosure, the size and shape of the active area 55 can be dynamically adjusted according to a position that the inadvertent touch event occurs on the object detection area 53. For example, when an inadvertent touch event occurring on the upper side of the object detection area 53 closes to a right hand side of the touch detection area 51, the active area 55 is adjusted as a shape of right triangle so as to cover the left side and the bottom side of the touch detection area 51; on the other hand, when the inadvertent touch event occurring on the lower side of the object detection area 53 closes to the right hand side of the touch detection area 51, the active area 55 is adjusted as a shape of right triangle so as to cover the left side and the upper side of the touch detection area 51. In another example, when the inadvertent touch event occurs on a vertical middle portion of at least one object detection area 53, a sub-area of the vertical middle portion of the touch detection area 51 is turned-off and the active area 55 is adjusted to cover two rectangle sub-areas that occupy the upper region and the bottom region of the touch detection area 51.

Figure 7:
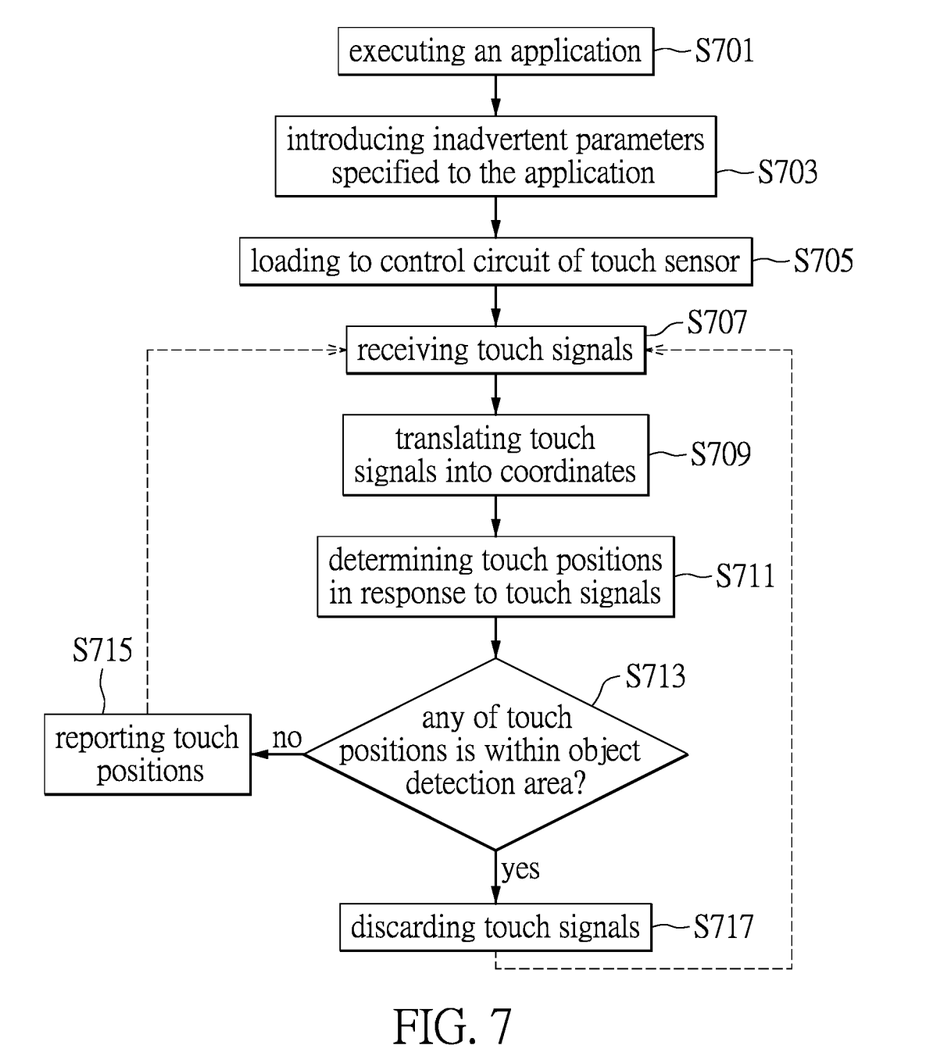
FIG. 7 is another flowchart describing a method for identifying an inadvertent touch event according to one embodiment of the present disclosure.

Reference is made to FIG. 7, which shows a flowchart introducing inadvertent parameters specified to the application executed in the operating system when performing the method for identifying an inadvertent touch event in one embodiment of the present disclosure. It should be noted that various sets of inadvertent parameters specified to various applications installed in the operating system can be stored in a storage device of the computer device in advance.

While the operating system of a computer device is in operation, one of the applications is executed and manipulated by a user that types on a keypad of the computer device by using his fingers. The computer device includes a touch pad near the keypad. The method for identifying an inadvertent touch event is performed by a control circuit of a touch sensor installed in the touch pad. Alternatively, the method can be performed by a specific sequence running in the operating system.

For preventing the inadvertent touch event while operating the computer device, such as when the application is executed in step S701, the inadvertent touch event can be identified by the following steps. In the meantime, a driver of the touch pad is executed in the operating system, and the driver acknowledges the application which is currently in operation. In the flow, such as in step S703, a set of inadvertent parameters specified to the application that is currently in operation are introduced, and loaded to the control circuit of the touch sensor through the driver, such as in step S705. The inadvertent parameters are provided to the control circuit to identify the inadvertent touch event adapted to the application which is currently in operation.

According to one aspect of the present disclosure, the active area of the touch pad can be adaptively adjusted based on a software type of the application executed in the operating system. Firstly, any application executed in the operating system can be classified into one of the software types that are configured to specify different sets of inadvertent parameters in order to adaptively identify the inadvertent touch event based on the software type of the application. More specifically, the inadvertent parameters essentially specify an object size sensed by the touch sensor and/or an active area of the touch pad. Further, the object size and/or the active area is configured to prevent the false touch by identifying the inadvertent touch event with a relatively small size threshold if the application is classified as the software type that seldom uses the touch pad of the computer device. On the contrary, the object size and/or the active area is configured to prevent the false touch by identifying the inadvertent touch event with a relatively large size threshold if the application is classified as the software type that frequently uses the touch pad of the computer device. It should be noted that the object size or the active area determines a sensitivity of the touch panel since the object size or the active area indicates an area when a touching object, e.g., the finger or a stylus, touches the touch panel, in which a larger object size or the active area indicates that the object size or the active area is very sensitive to touch events.

While manipulating the application, such as in step S707, a plurality of touch signals are generated and received by the control circuit of the touch sensor. The control circuit then translates the touch signals into coordinates in a coordinate system referring to an active area of the touch pad, such as in step S709. In step S711, in response to the touch signals, one or more touch positions can be determined. In step S713, the control circuit determines if any of the touch positions is within an object detection area that is in the active area configured to identify any inadvertent touch event.

In the method, in response to any touch event performed on the touch pad, after the touch signals are generated, the control circuit identifies the touch position corresponding to the touch signals. If the touch signals do not match the inadvertent parameters, for example, a large or small object size and/or the active area setting in the inadvertent parameters, the touch event is identified as a normal event, and the relevant touch positions are reported to the operating system (step S715). The flow then goes back to the step S707 and repeats the related steps. Otherwise, if the touch signals match a set of inadvertent parameters specified to the application executed in the operating system, the touch event is identified as the inadvertent touch event and the related touch signals are discarded (step S717). The flow then goes back to the step S707.

Further, in another aspect of the present disclosure, a machine-learning method is used to train the data of the touch signals collected over a period of time, specifically, the data is generated by the user's behavior of using the touch pad. Further, the data to be trained through the machine-learning method includes the touch signals generated from the user's behavior of using the touch pad for the various applications executed in the operating system. For example, the machine-learning method can learn the user's behavior and create the proper parameters in various types. Accordingly, a model can be established for identifying the inadvertent touch event based on the user's behavior. The inadvertent touch event can be identified by incorporating the model, and the model is incorporated to provide the corresponding set of inadvertent parameters when any of the applications is executed. Still further, the driver of the touch pad executed in the operating system is used to monitor the application currently used. The driver then loads the corresponding set of inadvertent parameters to the control circuit of the touch sensor or any sequence in the operating system so as to configure the thresholds regarding the object size and/or the size of active area for determining the inadvertent touch event.

For example, a learning algorithm is applied to learning that a probability of a user operating the touchpad is greatly reduced when an application is executed. The model is then used to determine if any inadvertent touch event occurs on the touchpad by detecting the touch signals collected for a period of time when the application is executed. Accordingly, based on this model when the application is executed, a touch event is identified as the inadvertent touch event when the touch signals generated by the touchpad is interpreted as a touching gesture performed by multiple fingers. Further, when the user uses a web browser to browse web pages without much opportunity for typing with the keypad of the computer device, the object size or the active area can be enlarged to a maximum since the probability of a false touch is small. Otherwise, when the user uses a document editor that requires a lot of typing with the keypad, the object size or the active area can be reduced to a proper size since the probability of false touch is increased greatly. Under an extreme circumstance, when the user plays a computer game by using only a computer mouse, the touch pad may be turned off since there is almost no possibility of false touch.

In conclusion, the above-mentioned embodiments of the present disclosure are related to a touch sensor, a touch pad having the touch sensor, a method for identifying an inadvertent touch event and a computer device.

For implementing the method for identifying the inadvertent touch event, an object detection area defined on the touch panel is configured to identify the inadvertent touch event. The object detection area is preferably formed by the sensing electrodes or the conductive lines outside a main part of the touch panel in order to sense the inadvertent touch event performed outside the main part of the touch pad, or the object detection area can be configured on a left side and a right side of the touch panel for sensing the inadvertent touch event that is performed by a part of the user's palm. Since the touch signals related to the inadvertent touch event can be effectively discarded, the computer device can prevent the false touch.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A touch pad, comprising:
a touch panel, which defines:
a touch detection area being defined by a set of interlaced transmit lines and receive lines, and being exposed within a window of an upper case; and
two object detection areas being defined at two opposite sides of the touch detection area, configured on a left side and a right side of the touch panel for sensing the inadvertent touch event that is performed by a part of the user's palm and being disposed under the upper case;
wherein, through the touch panel being formed by multiple interlaced transmit lines and receive lines, an inadvertent touch event is identified for discarding a plurality of touch signals when a touch position corresponding to at least one of the plurality of touch signals is within one of the two object detection areas;
wherein, when an object touches a position defined by one or more of the transmit lines and the receive lines of the touch panel and forms a touch event being performed on one of the two object detection areas, a number of the transmit lines or the receive lines that are active is reduced until the inadvertent touch event ceases;
when the inadvertent touch event occurs on a specific portion of the object detection area, a sub-area of a vertical middle portion of the touch detection areas is turned off and an active area being defined with a sensing area of the touch panel of the touch pad is adjusted to be separated into two sub-areas that occupy an upper region and a bottom region of the touch detection area, under a control of a control circuit.

2. The touch pad according to claim 1, wherein, in response to the touch event performed on the object detection area or the touch detection area of the touch panel, the touch signals are instantly processed by the control circuit of a touch sensor of the touch pad, the control circuit and an input signal pre-processing circuit.

3. The touch pad according to claim 2, wherein the control circuit is electrically connected to the input signal pre-processing circuit of the touch sensor, and the input signal pre-processing circuit is used to provide more precision touch signals to an operating system of a computer device equipped with the touch pad.

4. The touch pad according to claim 1, wherein the object detection area is formed by extra ones of the sensing electrodes outside a main part of the touch panel in order to sense the inadvertent touch event performed outside the main part of the touch pad.

* * * * *